Dec. 14, 1948.   J. YOUHOUSE   2,456,164
COMBINED INTERNAL-COMBUSTION AND TURBINE ENGINE
Filed April 5, 1944   5 Sheets—Sheet 1
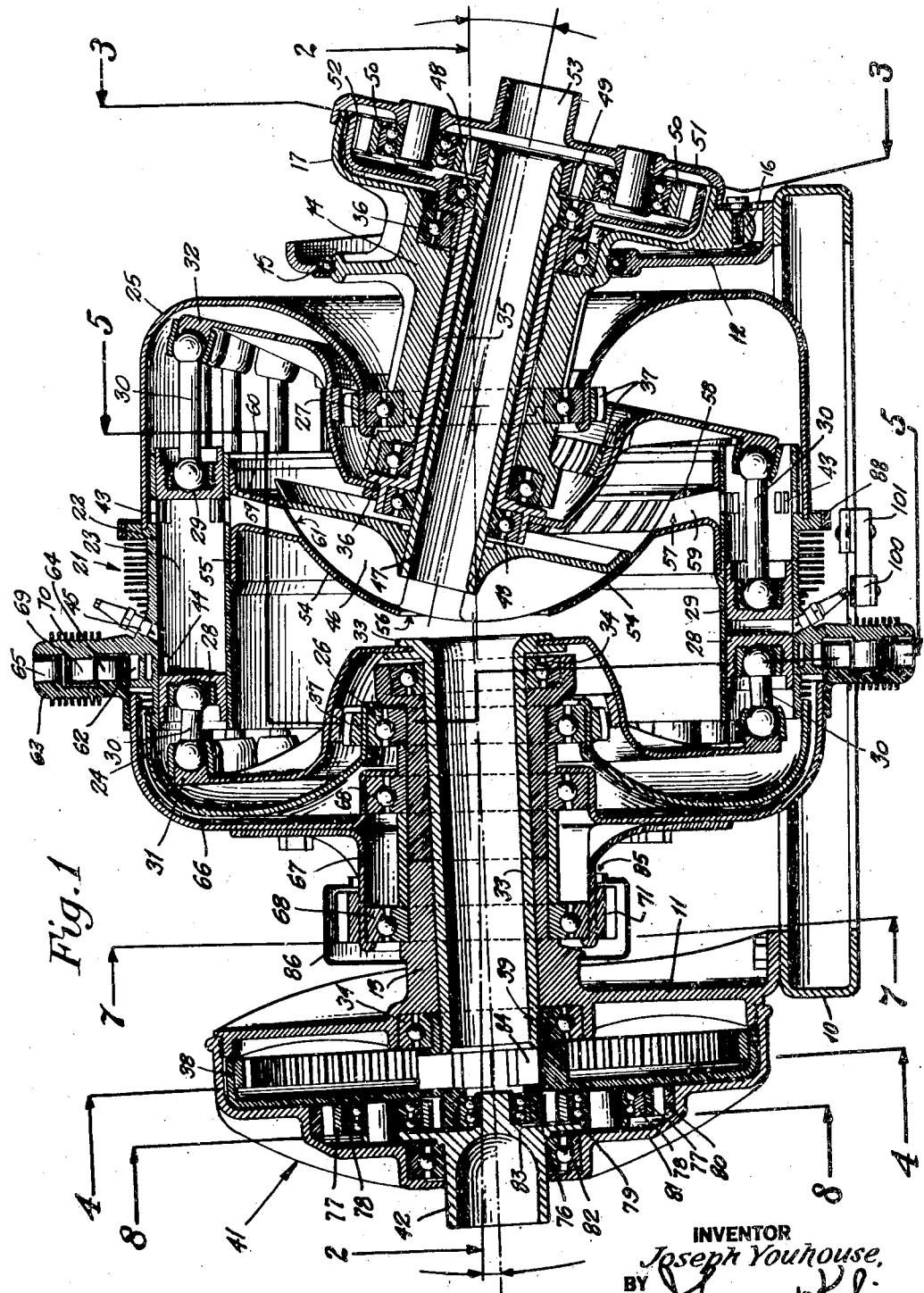
INVENTOR
Joseph Youhouse,
BY
ATTORNEYS

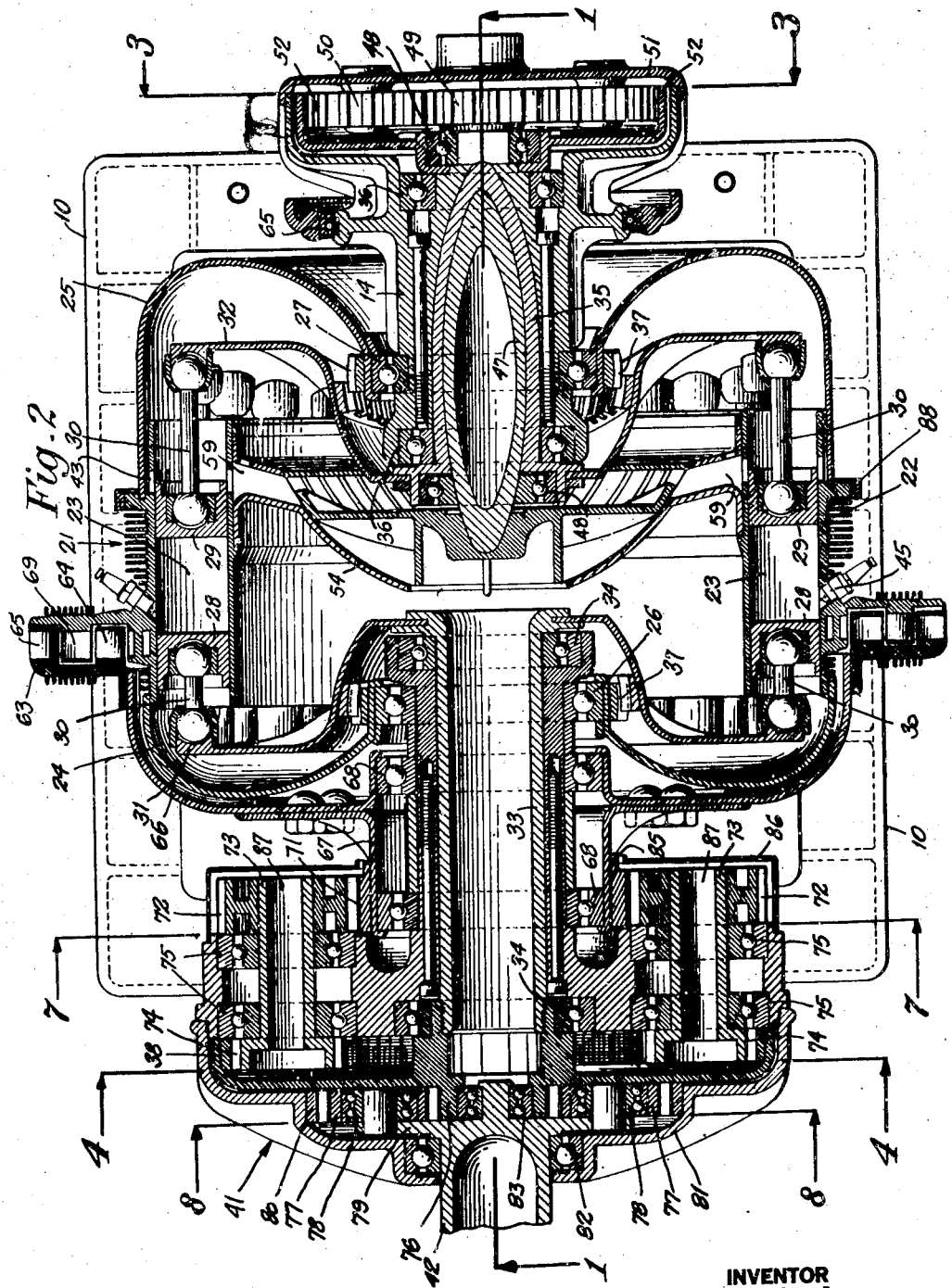

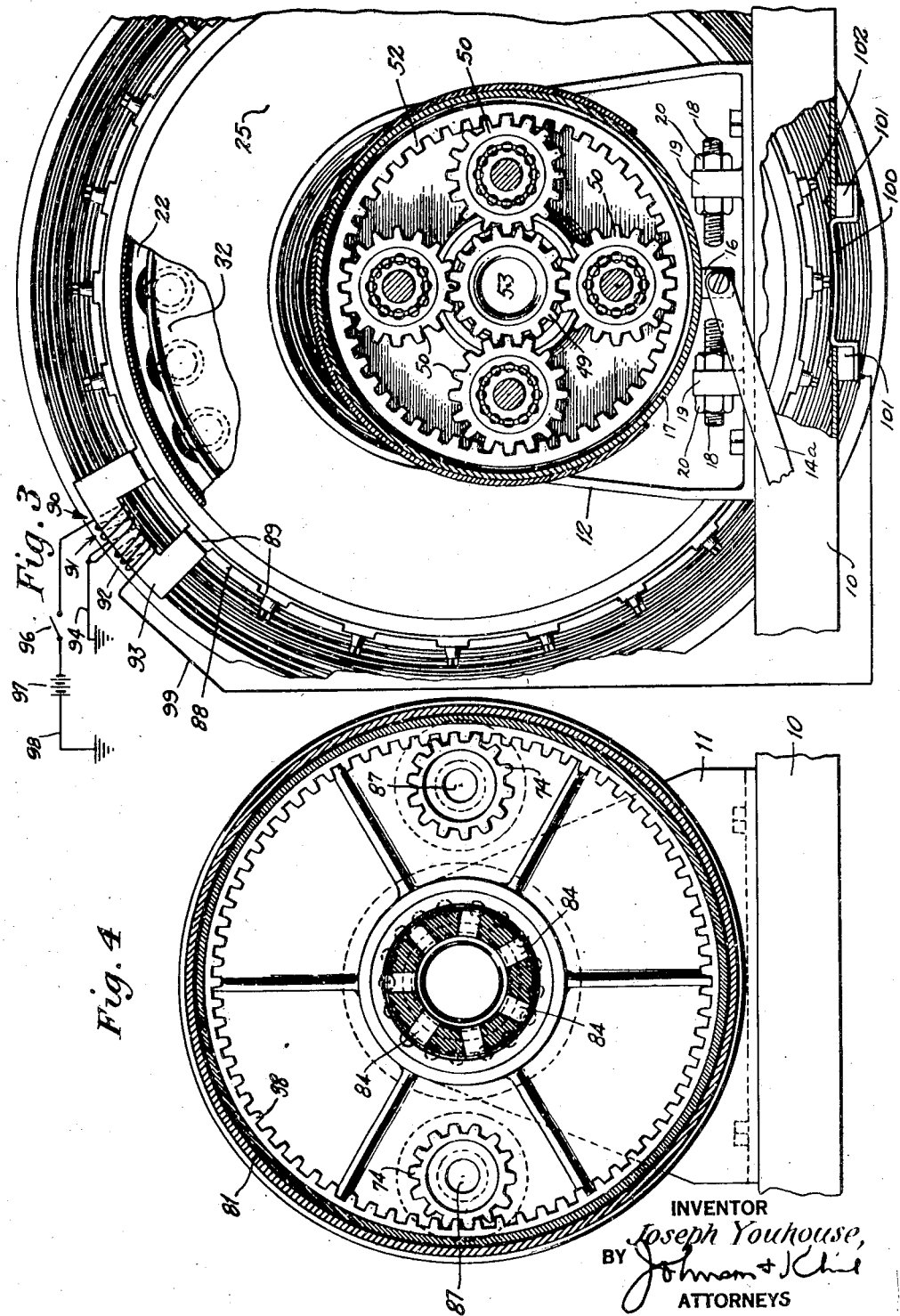

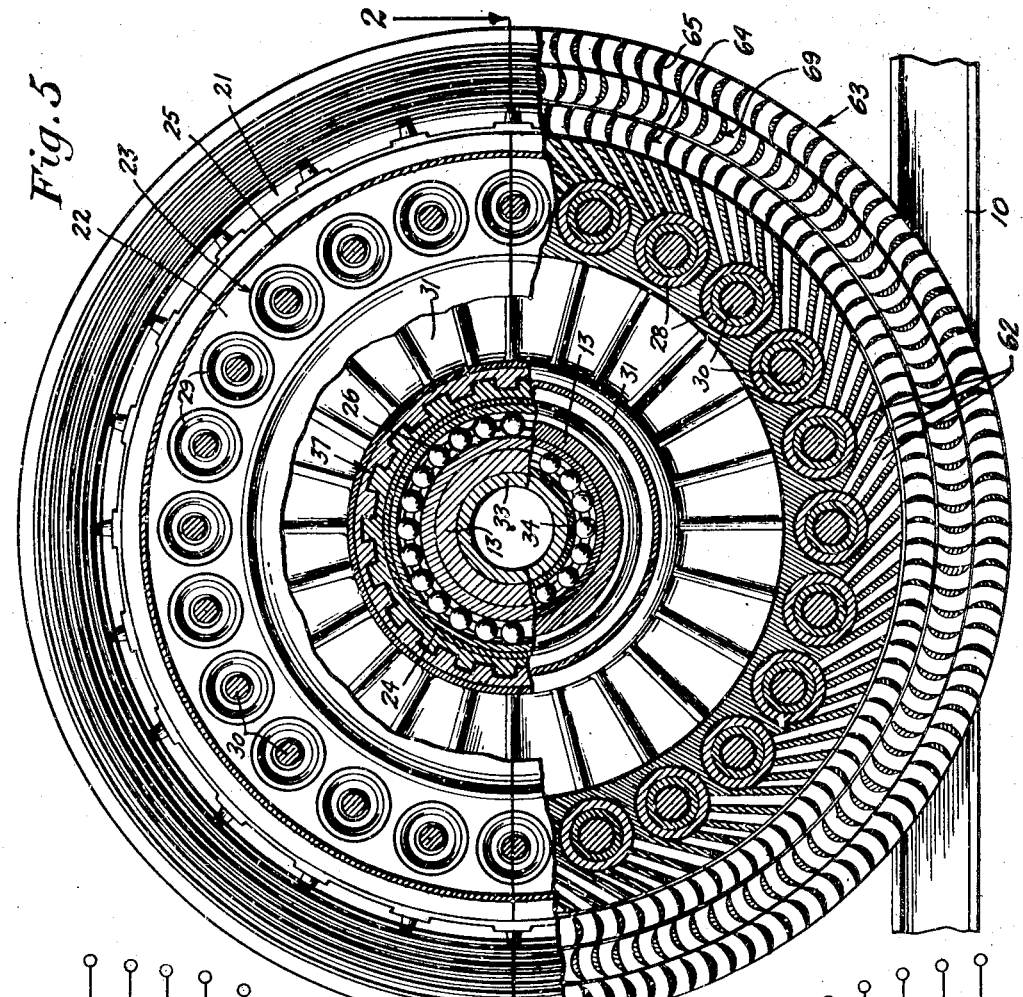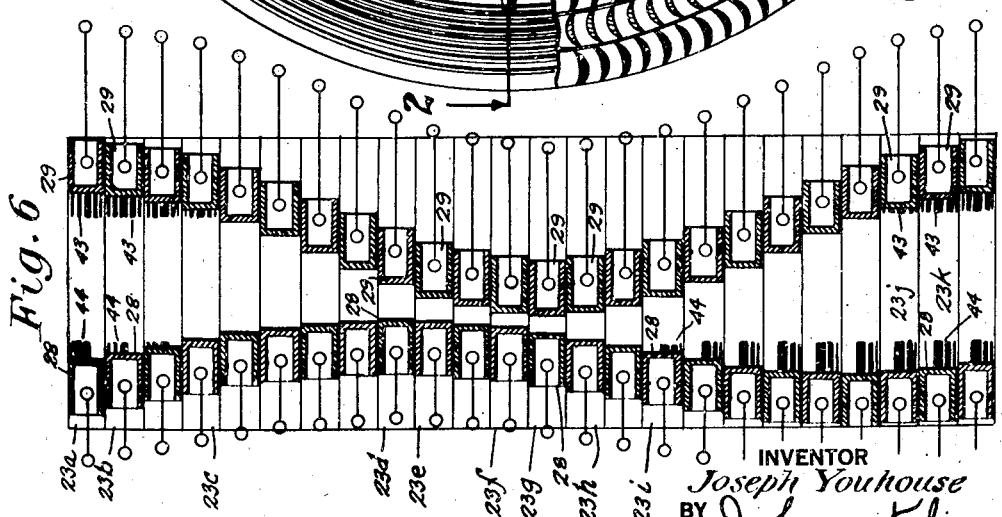

Dec. 14, 1948.  J. YOUHOUSE  2,456,164
COMBINED INTERNAL-COMBUSTION AND TURBINE ENGINE
Filed April 5, 1944  5 Sheets-Sheet 5

INVENTOR
Joseph Youhouse,
BY
ATTORNEYS

Patented Dec. 14, 1948

2,456,164

UNITED STATES PATENT OFFICE 2,456,164

COMBINED INTERNAL-COMBUSTION AND TURBINE ENGINE

Joseph Youhouse, Fairfield, Conn.

Application April 5, 1944, Serial No. 529,642

19 Claims. (Cl. 60—13)

This invention relates to combustion engines, and more particularly to a combined internal combustion turbine engine in which the propellant fluid for the turbine is developed or produced in working cylinders within the engine itself.

It is generally understood that a gas turbine engine has greater efficiency than a piston type engine. The efficiency of such an engine, however, has been reduced due to the necessity of diverting a relatively large portion of its developed power to compress the air-fuel mixture for combustion.

An object of the present invention is to provide an improved combination engine using both the expansible chamber principle, as with cylinders and pistons, and the turbine principle, in such a way as to benefit from the higher efficiency of the latter without detracting from this efficiency in the process of preparing the working substance for same. In accomplishing this, an engine is provided wherein after the first surge of power from the ignition of the gases is utilized in the cylinders, the exhaust ports in the latter are opened, and the products of combustion directed by suitable nozzles to turbine blades against which the expanding and fast-moving gases impinge to drive a rotor, which is suitably connected to the power take-off shaft to augment the power of the pistons. By this arrangement the energy of the fuel is utilized to the maximum extent.

In the form of the present invention herein illustrated as exemplary thereof, the object above referred to is accomplished, but, because of the arrangement of parts and details of construction, many other advantages and features are obtained. For instance, a difficulty encountered in turbine engines is that the high speed at which they operate requires speed reduction equipment which offsets to an extent the advantages. However, this difficulty is obviated by an arrangement wherein the cylinders of the engine rotate oppositely to the rotation of the turbine blades. As a result, the actual speed of the turbine is reduced by an amount equal to the speed of the cylinders, and the gear reduction is therefore simplified correspondingly. This construction also reduces the momentum and centrifugal forces developed by the operation of the engine, and reduces gear and bearing wear and noise.

According to the present invention, the ignition of the air-fuel mixture in the cylinders occurs at one point with respect to the frame of the engine, and the directing of the gases of combustion against the turbine blades takes place over approximately one-third of the distance around the engine. Thus, at all times during the operation of the engine, about two-thirds of the turbine blade structures are cooling off while the other third is being impinged upon by the hot exhaust gases.

In order to utilize the initial expansion of the gases for piston driving, and the subsequent combustion and expansion of the gases for turbine driving, the present invention provides for opening the exhaust ports of the cylinders very soon after the ignition of the gases has taken place. In the broader aspects of this invention, this may be accomplished by any suitable means. However, in the form of the invention herein disclosed, the exhaust ports are controlled by pistons which are arranged in the cylinders oppositely to the main pistons and which have a relatively shorter travel. The exhaust ports are so located with respect to the piston travel that they are opened almost immediately after the fuel is ignited, and remain open for the remainder of the power stroke of the piston.

The arrangement of the expansible chamber portion of the engine is such that thorough scavenging of the cylinders is accomplished, the scavenging also effecting a cooling of the turbine blades.

According to the present invention, by controlling the relative timing of the pistons, the compression ratio of the engine may be varied within substantial limits to compensate for fuels of different flash points, and also to provide for self-ignition if the fuel used is capable of the same, and if desired.

The invention also provides a novel form of ignition system, there being no conventional distributor with its make and break points. Instead, the high potential current is generated by magnetically coupling a primary and secondary as the cylinders approach the firing point, and transmitting the high tension current at such point directly to the spark plug, preferably through a jump gap.

In producing the properly timed electrical impulses, a novel system of open-core ignition coil, and magnetic circuit-completing rotor member mounted on the cylinder block, is provided. However, in the broader aspects of this invention, any suitable igniting system may be employed, or self-ignition of the compressed charge in the cylinders by heat and pressure may be depended upon (instead of the spark ignition), and this may be controlled as to timing by the variable compression ratio adjustment already mentioned.

There being no valves as such, the cylinder and piston portion of the engine may be run at very high speed, as is desired for most efficient operation of the turbine part of the engine.

Other features and advantages will hereinafter appear.

In the accompanying drawings—

Figure 1 is a vertical section through the engine of the present invention, the section being taken on the line 1—1 of Fig. 2.

Fig. 2 is a horizontal section taken on the line 2—2 of Figs. 1 and 5.

Fig. 3 is a transverse sectional view taken on the line 3—3 of Figs. 1 and 2.

Fig. 4 is a similar view taken on the line 4—4 of Figs. 1 and 2.

Fig. 5 is also a vertical transverse section taken on the line 5—5 of Fig. 1.

Fig. 6 is a diagrammatic view showing the progression of the pistons toward each other and their positions with relation to the exhaust ports.

Figure 7:
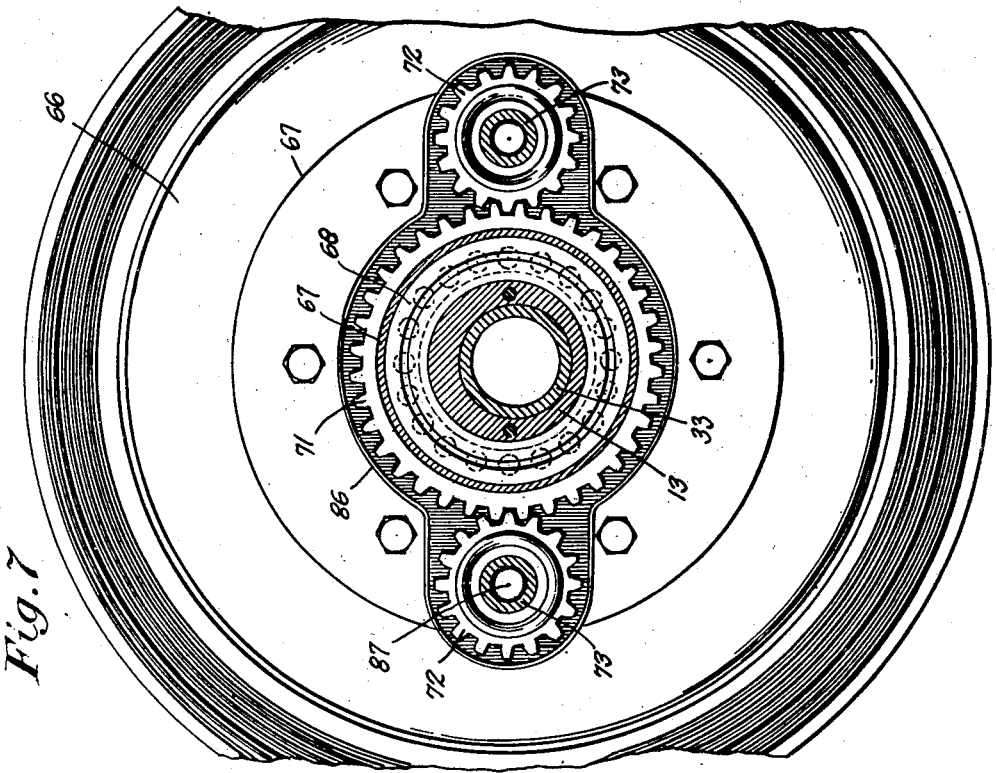
Fig. 7 is a vertical transverse section taken on the line 7—7 of Figs. 1 and 2.

As shown in the accompanying drawings, the engine of the present invention comprises a base 10 having vertical supports 11 and 12 carrying the rotatable parts of the engine. The support 11 has fixed to it a horn-like sleeve 13 on which the left-hand ends (as viewed in Fig. 1) of the rotating parts are supported by suitable ball bearings, while the support 12 carries a horn-like sleeve 14 on which the rotating parts at the right-hand side of the engine are mounted by suitable ball bearings.

In the broader aspects of the invention, the horn 14 may be fixed to the support 12, but for a special reason hereinafter referred to it is rotatably carried by the support on ball bearings 15 for a limited rotary or adjustable movement. The horn 14 is moved and held in adjusted position by an operating link 14a pivotally connected to a lug 16 on a gear case 17 which forms part of the horn. The link 14a may be manually controlled by the operator of the engine. Movement of the horn 14 is limited by adjustable stops in the form of screws 18 mounted in lugs 19 of the support 12, and locked by nuts 20.

The cylinder block, represented as a whole by reference numeral 21, is in the form of an annular body 22 longitudinally bored at equally spaced angular distances to provide a circular row of cylinders 23. Welded or otherwise secured to the marginal edges of the annular body 22 are end plates 24 and 25 which have their inner portions supported by bearings 26 and 27 on the horns 13 and 14 respectively, and it is on these bearings that the cylinder block 21 rotates about a horizontal axis.

Each cylinder, according to the present invention, is provided with opposite pistons 28 and 29 which, in the course of operation of the engine, move together to compress between them an explosive mixture, and upon the ignition thereof move apart within the cylinder and develop power. In the form shown, the engine, being of the so-called two cycle variety, each time the pistons move inwardly, the combustible mixture is compressed and an explosion takes place. In order to regulate the movements of the pistons and utilize the power thereof, each piston has a connecting rod 30 connected to it at one end and connected to a reaction member at the other end, the pistons 28 being connected to a reaction member 31 and the pistons 29 being connected to a reaction member 32. The reaction members are in the form of plates or disks, the member 31 being connected to a sleeve 33 mounted on bearings 34 carried by the horn 13, while the member 32 is connected to a sleeve 35 mounted on bearings 36 on the horn 14. The reaction members 31 and 32 are splined to the plates 24 and 25 of the cylinder block by spline teeth 37 so that the reaction plates and the cylinder block have coordinate angular movement.

The axes of the reaction plates 31 and 32 are inclined with reference to the axis of rotation of the cylinder block, and thus, as the plates 31 and 32 rotate with the cylinder block, the points of connection of the connecting rods to the reaction plates travel in an orbit, progressively moving away from and then back toward the cylinders. Thus, when the mixture compressed between the pistons, as at the bottom of Fig. 1, is ignited and the pistons are forced apart, the connecting rods 30 of the pistons tend to push the reaction plates 31 and 32 away from the cylinder block. Because the reaction members do not yield in this direction, the force will be resolved into a rotary force as down an inclined plane, and this force causes the reaction members and the cylinder block, through the spline teeth 37, to rotate. The power thus developed is transferred through the reaction member 31 and sleeve 33 to an internal gear 38 secured to the sleeve 33 as by screw threads 39 of a power take-off device indicated as a whole by the reference numeral 41 and including a drive shaft 42.

The explosive mixture is injected into the cylinders 23 through intake ports 43 at the right-hand end of the cylinders as viewed in Fig. 1. As the piston 29 approaches the end of its driving stroke, the ports 43 are opened by the passage of the piston beyond them and the combustible mixture is permitted to enter the cylinder. The cylinders are provided with outlet ports 44, and these are controlled by the pistons 28. The reaction plate 31 is inclined from the vertical less than the reaction plate 32, and hence while the pistons move apart simultaneously, they do not move apart to the same extent. The pistons 28 move only a small amount while the pistons 29 move a large amount, the arrangement being such that the exhaust ports 44 may be opened much sooner than the inlet ports for reasons referred to below. Besides this, the reaction members 31 and 32 are so disposed that the pistons do not reverse their directions of movement at the same time. The relative movements of the pistons are diagrammatically illustrated in Fig. 6. In this figure, in the cylinder 23a the piston 28 has started to close the exhaust ports 44 while the intake ports 43 are still left wide open by the piston 29. In this position, the cylinder is being filled with the combustible mixture which enters through the ports 43 forcing the remaining exhaust fumes out through the exhaust ports 44. In the next cylinder 23b, the piston 28 continues to close the ports 44 and the piston 29 begins to close the ports 43. This continues in the next cylinder, and in the following cylinder 23c the exhaust ports are closed while the inlet ports are still partially open. In succeeding cylinders, the pistons 28 and 29 continue to move toward each other until the point of maximum compression is reached. At the cylinder 23d, the piston 28 has reached its maximum forward position while the piston 29 continues to advance. At the cylinder 23e, the piston 28 has started to move in the opposite direction, but the piston 29 is continuing to advance and at a greater rate of speed. This continues until the cylinder 23f is reached in which the mixture in the cylinder reaches its greatest compression, and it is at this or an adjacent point that the mixture is ignited by the spark plug 45 of that cylinder. In the cylinder 23g, nothwithstanding the ignition of the mixture, the piston 29 continues to advance slightly while the piston 28 continues to recede. In the cylinder 23h, the piston 29 also begins to recede, and in the next cylinder this is continued. In the cylinder 23i, the piston 28 has receded to the point where the exhaust ports 44 are open slightly and in continuing cylinders the ports are opened more and more, permitting the products of combustion to be exhausted and utilized in a manner explained below. This continues until the gases in the cylinder become practically inert. In the cylinder 23j, the piston 29 has receded to a point where the inlet ports 43 are opened, thus permitting the fresh mixture to enter the cylinder and scavenge the products of combustion remaining therein. In the cylinder 23k, the intake ports 43 are opened still farther, but due to the lead which the piston 28 has over the piston 29, the piston 28 begins to close the exhaust ports 44, and this continues in the next cylinder until the position corresponding with the position of the cylinder 23a is reached when the piston 29 begins to close the inlet ports and the cycle above described goes on.

By the elimination of intake and exhaust poppet valves through the use of piston-controlled ports, much higher engine speeds are possible, since the problem of sticking or lagging valve action is not present. This is of advantage in the engine of this invention, since turbine efficiencies depend on high speeds, and since, as will be later brought out, provision has been made for high speed spark ignition, or for high speed self ignition.

It is one of the features of the present invention that the compression ratio may be varied while the engine is running. This is useful in permitting the engine to accommodate different kinds and types of fuel, and different mixtures of these with air. Also, in the broader aspects of the invention, self-ignition instead of spark-ignition may be employed, and therefore the timing of the explosions, dependent on temperature and pressure, may be controlled by the adjusting of the compression ratio.

Variation of this ration is accomplished by adjusting the orbit of the reaction plate 32 with reference to the reaction plate 31. This is accomplished by rotating the horn 14 in the bearings 15 as by means of adjusting the nuts 20. Assuming that the firing point is at the position of the cylinder 23f in Fig. 6—if the pistons 29 are retarded, that is to say, assuming that the curve formed by the piston 29 is moved upwardly, it will be seen that the space between the piston 28 and the piston 29 at the firing point represented by the cylinder 23f will be less than that shown, and that, therefore, the combustible mixture will be compressed to a greater extent at this firing point than it is in the drawings. Likewise, if the curve is moved downwardly, a greater space will be left between the pistons 28 and 29 at the firing point represented by the position of the cylinder 23f.

One of the features of the present invention is the provision of means powered by the engine itself for supercharging the combustible mixture fed to the cylinders so that when the exhaust ports are opened, the supercharged mixture will rush into the cylinders and, by means of the kinetic energy of the gases, force the products of combustion out of the cylinders.

In the form of the invention herein disclosed, this is accomplished by providing a fan or propeller 46 within the annular cylinder block 22, which is mounted on a tube 47 having bearings 48 on the sleeve 35 of the reaction member 32. The end of the tube 47 has a pinion 49 meshing with intermediate gears 50 mounted on a plate 51 secured to the gear casing 17 on the horn 14. The intermediate gears 50 mesh with an internal gear 52 secured to the sleeve 35 of the reaction plate 32. Thus, when the plate 32 rotates through the medium of the internal gear 52 and intermediate gears 50, the pinion 49 is rotated in a direction opposite to the direction of rotation of the cylinder block 21 and at high relative speed.

The fuel is fed to the engine in the form of gases or vapor through a nipple 53 on the plate 51, thence through the tube 47 to the impeller 46. Air is fed through the hollow shaft or sleeve 33 from which it is drawn by the action of the impeller 46. The front end of the impeller is covered by a plate 54 which has a flange 55 fastened by welding or otherwise to the inside of the annular cylinder block 22. Hence the space between the reaction member 32 and the plate 54 becomes a mixing chamber for the air and combustion vapors. The plate 54 has a central opening 56 through which the air is drawn and forced outwardly by the rapidly rotating impeller 46 into channels 57 formed by the plate 54 and another plate 58. These channels have partitions or diffusers 59 which pick up the gases thrown off by the impeller blades and guide them to the inlet ports 43 of the cylinders. There are openings 60 in the plate 58 through which some of the gases under pressure escape into a chamber formed between the supercharger and the end plate 25 of the cylinder block. The axis of rotation of the impeller 46 being inclined to the axis of rotation of the cylinder block 21, the top portion of the impeller is constantly in such position that the outer edges 61 thereof coincide with the channels 57. Since it is at this time that the inlet ports 43 and exhaust ports 44 are open, the gases being driven by the impeller pass directly and with considerable kinetic energy into the cylinders, and thus efficiently scavenge the products of combustion remaining in the cylinders. At the other places around the cylinder block, the outer edges 61 of the impeller are covered by the plate 54, and thus the gases cannot escape from the edges of the impeller blades until the points are reached at which they should be projected into the cylinder. Thus considerable pressure is built up by the blades in advance of their reaching the points at which the gases enter the cylinders. According to the present invention the energy of the exhaust gases immediately after they leave the cylinders 23 is utilized to supply driving force to the power take-off device 41 in addition to that provided by the action of the pistons 28 and 29. In driving apart these pistons, the exploded gases give up only a portion of their kinetic energy, so that when the exhaust ports 44 are opened the gases continue to expand at a rapid rate and rush out of these ports under considerable pressure, and at a rapid speed.

In order to utilize the energy of the exploded gases to the fullest extent the present invention provides nozzle means directly connected with the cylinder exhaust ports 44, and provides velocity staged turbine blades arranged to receive the jets from the nozzles and geared to the take-off device 41.

Referring to Figs. 1 and 5, each of the cylinders 23 has a plurality of nozzles 62 each connected to one of the exhaust ports 44 and extending angularly outwardly through the block 22. A velocity-staged turbine rotor 63 having inner and outer rows of blades 64 and 65 respectively is mounted to rotate about the block 22, the rotor being carried by a dished plate 66 having a hub 67 mounted by bearings 68 on the sleeve 13. A row of redirecting blades 69 is carried by an external flange 70 integral with the block 22, to complete the staging of the turbine.

The exhaust is taken from the outer row of blades 65 by a suitable manifold, not shown.

Due to the considerable remaining kinetic energy of the exploded gases after they have accomplished their work on the pistons 28 and 29, the turbine rotor 63 will be driven at a comparatively high rate of speed. The power of the rotor is transmitted to the power take-off device 41 through a spur gear 71 mounted on the hub 67 (Figs. 1, 2, and 7) and engaging a pair of gears 72 carried on jack shafts 73 which have gears 74 engaging the internal gear 38. The shafts 73 are carried in bearings 75 mounted in the stationary support 11 for the engine.

This gearing is such that the speed of the rotor 63 may be greater than the speed of the cylinders 23 during running of the engine, so that both units may be operated near their efficiency peak.

By the arrangement of mounting the cylinder block structure and the rotor blade structure to each rotate in a direction opposite to the other, a high relative speed is attained between these structures without either one rotating at a comparable speed. Thus the effect of centrifugal force on the structures is minimized, and bearing and gear wear and noise reduced.

Figure 8:
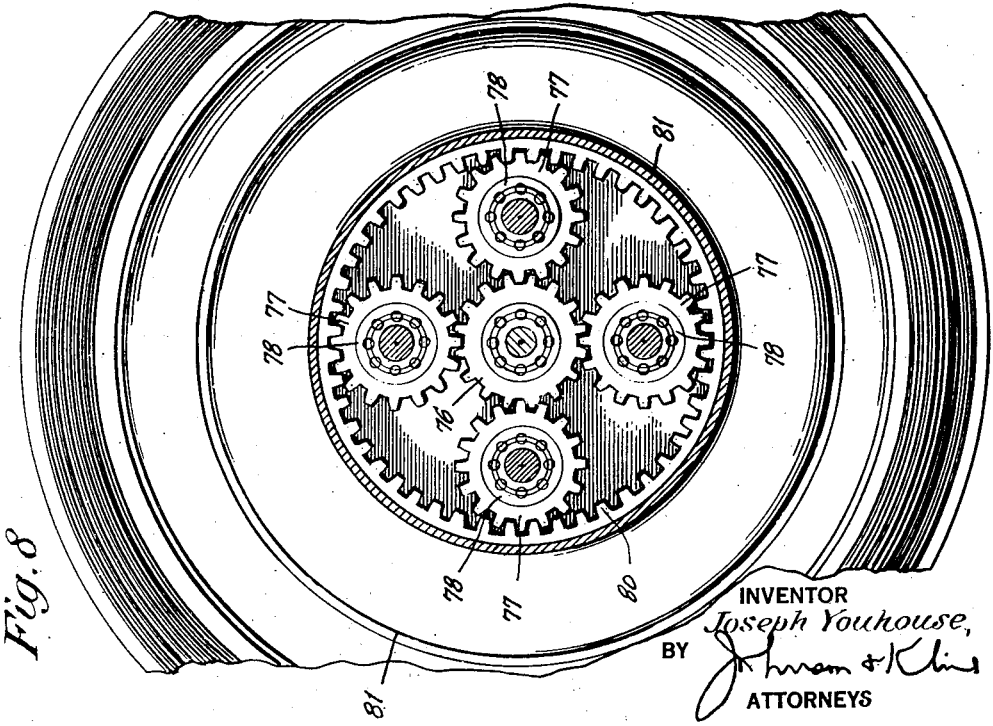
Fig. 8 is a similar view taken on the line 8—8 of Figs. 1 and 2.

The transmission from the internal gear 38 to the drive shaft 42 comprises a spur gear 76 which is integral with the internal gear, and engages a plurality of idlers 77 (Figs. 2 and 8) carried by bearings 78 on a spider 79 fastened to the drive shaft 42.

According to the explosion cycle of the cylinders 23, the rows of blades 64, 69 and 65 comprising the turbine unit will be acted on by the exhaust gases during only a part of each revolution they make, and during the remainder of the revolution cooling of the blades will take place. This cooling is accelerated during the first portion of the remainder of the revolution by the scavenging action provided by the supercharger. During the period of intake, the combustible mixture is forced into the cylinders under pressure and until the exhaust ports close, this mixture will follow the exhaust gases into the turbine and effect a cooling of the blades thereof. The idlers 77 also engage a stationary internal gear 80 mounted in a supporting housing 81 carried by the support 11, so that turning of the gear 76 will cause driving of the spider 79 and shaft 42. The latter is carried by bearings 82 and 83 mounted respectively in the housing 81 and bore of the spur gear 76 which latter is integral with the internal gear 38.

The turbine rotor 63 is thus geared to the cylinder block 22, the ratio being such that the speed of the rotor is much greater than the speed of the block when the engine is running.

Air enters the sleeve 33 through ports 84 in the hub of the internal gear 38, communication with the outside atmosphere being had through a clearance opening 85 between a housing 86 enclosing the gears 71 and 72, and the hub 67 of the turbine rotor. Besides going around the outside of the gear 71 and gears 72, the air may also pass through bores 87 in the jack shafts 73 and thus aid in cooling the latter.

Another feature of this invention is the novel energization of the spark plugs 45 for igniting the compressed mixture in the cylinders. This energization obviates the necessity for numerous wire connections from a distributor, for instance, to the spark plugs, and is accomplished as follows: Referring to Fig. 3, the cylinder block 22 is provided with a ring 88 of magnetic material having a plurality of lugs 89 equi-spaced around its circumference, one for each cylinder, the outer convex surfaces of the lugs being accurately machined to lie in a theoretical cylindrical surface concentric with the axis of the block. An ignition coil 90 having a primary 91, secondary 92, and V-shaped core 93 is mounted on a stationary support (not shown) so that the lugs 89 consecutively sweep past the ends of the core with only a small air gap in between.

One end each of the primary 91 and secondary 92 are connected together and grounded by a wire 94 to the frame of the engine. The other end 95 of the primary is connected to an ignition switch 96 in turn connected to a battery 97 having its other pole grounded by a wire 98. The other end of the secondary 92 is connected by a wire 99 to a plate 100 carried on insulating blocks 101 mounted on the frame 10 of the engine.

The plate 100 is curved and located in a position where the exterior ends 102 of the center spark plug electrodes pass close to the concave plate surface along its length.

Operation of the ignition system is controlled by the switch 96, and when this latter is closed current supplied by the battery 97 will flow through the primary coil 91 and magnetize the core 93. Periodically during rotation of the engine block 22, whenever a pair of lugs 89 align with the ends of the core 93 the magnetic circuit will be completed through the core and the magnetic lines coupling the secondary coil 92 will be a maximum. As the lugs 89 disalign themselves from the core ends, the magnetic circuit will be broken and the magnetic flux coupling the secondary 92 will change rapidly to a lower value, causing an induced voltage in the secondary which will cause a surge in the wire 99. This surge will jump from the plate 100 to the particular plug 45 adjacent the plate at the time, causing a spark inside the cylinder and igniting the compressed mixture.

The angular position of the ignition coil 90 about the axis of the block 22 with respect to the cylinders determines whether the spark is advanced or retarded.

It will be seen that the internal combustion portion of the engine of this invention, consisting of the cylinders 23, pistons 28 and 29, etc. constitutes an efficient means for providing a high pressure fluid having high kinetic energy for operating the turbine portion of the engine, without requiring any of the power developed by the turbine to produce this fluid.

Lubrication of the engine is accomplished in the conventional manner, in conjunction with an outside sump pump (not shown).

Variations and modifications may be made within the scope of this invention and portions of the improvements may be used without others.

I claim:

1. An engine having combustion chambers mounted to rotate on an axis; means for compressing a combustible mixture in said chambers and igniting the same; exhaust ports for the chambers; a rotatable turbine blade structure having two concentric sets of blades in circular rows lying in the plane of rotation of the combustion chambers and rotatable oppositely thereto; a set of blades interposed between said two sets of blades and rigidly connected to the combustion chambers; and nozzles connected with the exhaust ports and directing the combustion gases therefrom against said turbine blades, the jet action of the gases issuing from said nozzles tending to propel the combustion chambers in the direction of their rotation, and propelling the two sets of blades of the turbine blade structure in the opposite direction.

2. A combined internal combustion and turbine engine having a first and a second cooperating turbine blade structure rotatable in opposite directions; power take-off means for translating said rotatable movements into a unidirectional drive; a third cooperating turbine blade structure rotatable with the second blade structure; and internal combustion means rotatable with said first structure for producing a propelling fluid and directing same against the turbine blades of the second structure, and thereafter against the turbine blade of the first structure.

3. A combined internal combustion and turbine engine having a first and a second cooperating turbine blade structure rotatable in opposite directions, each including a plurality of sets of turbine blades; power take-off means for translating said rotatable movements into a unidirectional drive; and means rotatable with said first structure for producing a propelling fluid and directing same against the turbine blades of the second structure, and thereafter against the turbine blades of the first structure and again against the blades of said second structure.

4. A combined internal combustion and turbine engine having a first and a second cooperating turbine blade structure rotatable in opposite directions, each including a plurality of sets of turbine blades; power take-off means for translating said rotatable movements into a unidirectional drive; and means rotatable with said first structure for producing a propelling fluid and directing same against the turbine blades of the second structure, and thereafter against the turbine blades of the first structure, said power take-off means being constructed to enable the second turbine blade structure to rotate at a higher actual speed than the first.

5. A combined internal combustion and turbine engine having internal combustion cylinders arranged in a circle and rotatable as a unit, and a plurality of staged turbine blade structures, one of which is next to the said cylinders, the said structures being arranged to rotate in opposite directions whereby the relative speed between the turbine blade structures is greater than the actual speed of either, the said internal combustion cylinders being connected to and rotatable with the turbine blade structures succeeding the structure next to the cylinders; reciprocating pistons in said cylinders; means for causing rotation of the cylinder unit in response to driving force applied to the pistons; means for directing exhaust gases from the cylinders against the turbine blade structure which rotates oppositely to the said cylinders; and a differential drive power take-off connected to the cylinder unit and the turbine structure.

6. A combined internal combustion and turbine engine having two cooperating sets of turbine blades rotatable in opposite directions; power take-off means for translating said rotatable movements in a unidirectional drive; internal combustion means rotatable with and spaced from one of said sets of turbine blades for producing a propelling fluid, the other set of turbine blades being interposed between the said one set and the internal combustion means; and means directing said fluid first against the other of the sets of turbine blades, the said fluid then being directed against the said one set of blades spaced from the said means.

7. A combined internal combustion and turbine engine having two cooperating turbine blade structures rotatable in opposite directions; power take-off means for translating said rotatable movements into a unidirectional drive; internal combustion units rotatable with one of said structures; means for directing the combustion gases from said units against the turbine blades of said structures successively to drive the same; and means transmitting power developed by internal combustion in said units to the turbine blade structures to augment the power produced by said combustion gases.

8. A combined internal combustion and turbine engine having internal combustion cylinders arranged in a circle and rotatable as a unit, and a turbine blade structure adjacent said cylinders and arranged to rotate in a direction opposite thereto whereby the relative speed between the turbine blade structure and the cylinder unit is greater tnan the actual speed of either; reciprocating pistons in said cylinders; means for causing rotation of the cylinder unit in response to driving force applied to the pistons; means for directing exhaust gases from the cylinders against the turbine blades of said structure; and another turbine blade structure adjacent the first to receive gases therefrom, and connected to move with the cylinder unit.

9. A combined internal combustion and turbine engine having internal combustion cylinders arranged in a circle and rotatable as a unit, and a turbine blade structure adjacent said cylinders and arranged to rotate in a direction opposite thereto whereby the relative speed between the turbine blade structure and the cylinder unit is greater than the actual speed of either; a pair of opposed reciprocating pistons in each of said cylinders, geared to move relatively to each other according to a predetermined plan; means for causing rotation of the cylinder unit in response to driving force applied to the pistons; means for directing exhaust gases from the cylinders against the turbine blades of said structure; and means for changing the plan of relative movement of the opposed pistons while the engine is running and without changing the stroke of the pistons, to change the compression ratio in the cylinders.

10. A combined internal combustion and turbine engine having internal combustion cylinders arranged in a circle and rotatable as a unit, and a turbine blade structure adjacent said cylinders; means for gearing the turbine blade structure to rotate in a direction opposite to the cylinders whereby the relative speed between the turbine blade structure and the cylinder unit is more than twice as great as the actual speed of the cylinder unit; reciprocating pistons in said cylinders; means for causing rotation of the cylinder unit in response to driving force applied to the pistons; and means for directing exhaust gases from the cylinders against the turbine blades of said structure.

11. A combined internal combustion and turbine engine having two annular concentric cooperating turbine blade structures rotatable in opposite directions; power take-off means for translating said rotatable movements into a unidirectional drive; internal combustion units arranged in squirrel-cage fashion within said annular blade structures; means for causing said units to rotate with one of the said blade structures remote from the unit; and means for causing said units to fire in succession and to exhaust and direct the combustion gases therefrom to circularly successive portions of the blade structures.

12. A combined internal combustion and turbine engine having two sets of interdigitated cooperating turbine blade structures rotatable in opposite directions, each set comprising a plurality of concentrically disposed annular turbine elements; power take-off means for translating said rotatable movements into a unidirectional drive; internal combustion units rotatable with one of said structures; and means for directing the combustion gases from said units in an annular progression against succeeding portions of each blade structure to drive the same.

13. A combined internal combustion and turbine engine having two annular concentric cooperating turbine blade structures rotatable in opposite directions; power take-off means for translating said rotatable movements into a unidirectional drive; an annular body to which the outer one of said annular turbine structures is secured and mounted to rotate within the other annular turbine structure, said annular body having a series of axially parallel bores forming cylinders of internal combustion units; pistons in said cylinders for compressing a combustible mixture therein; means for firing the compressed mixture; and means for directing the products of combustion from said cylinder against the turbine blades of said structures successively.

14. A combined internal combustion and turbine engine having at least three concentric nested annular cooperating turbine blade structures, alternate structures being connected together and comprising two units rotatable in opposite directions; power take-off means for translating said rotatable movements into a unidirectional drive; an annular body to which one of said anular turbine structures is secured and mounted to rotate within the other annular turbine structure, said annular body having a series of axially parallel bores forming cylinders of internal combustion units; pistons in said cylinders for compressing a combustible mixture therein; means for firing the compressed mixture; means for directing the products of combustion from said cylinders against the turbine blades of said structures successively; means for transmitting the power developed by the internal combustion in said cylinders to rotary motion; and means for transmitting said rotary motion to the power take-off means to augment the power produced by said products of combustion.

15. A combined internal combustion and turbine engine having at least three concentric nested annular cooperating turbine blade structures, alternate structures being connected together and comprising two units; power take-off means for translating said rotatable movement into a unidirectional drive; an annular body to which one of said annular turbine structures is secured, said body being mounted to rotate within the other annular turbine structure and having a series of axially parallel bores forming cylinders of internal combustion units; a pair of pistons in each cylinder for compressing a combustible mixture therein; means for firing the compressed mixture, said blade structure being located intermediate the ends of the cylinders; ports in the wall of each cylinder directing the products of combustion from said cylinders directly against the turbine blades of said structures successively; means for transmitting the power developed by the internal combustion in said cylinders to rotary motion; and means for transmitting said rotary motion to the power take-off means to augment the power produced by said exhaust products of combustion.

16. A combined internal combustion and turbine engine having nested annular cooperating turbine blade structures rotatable in opposite directions; power take-off means for translating said rotatable movements into a unidirectional drive; an annular body to which one of said annular turbine structures is secured, said body being mounted to rotate within the other annular turbine structure and having a series of axially parallel bores forming cylinders of internal combustion units; a pair of pistons in each cylinder for compressing a combustible mixture therein; means for firing the compressed mixture, said blade structure being located intermediate the ends of the cylinders; ports in the wall of each cylinder directing the products of combustion from said cylinders directly against the turbine blades of said structures successively; and means converting the power developed by the internal combustion in said cylinders to rotary motion in such manner as to cause said body to rotate, said last-named means being connected to the pistons in such manner as to cause one of the pistons in each cylinder to open said ports substantially in advance of the other piston reaching the end of its stroke.

17. A combined internal combustion and turbine engine having two annular cooperating turbine-blade structures rotatable in opposite directions and each having a plurality of spaced concentric annular rows of blades; power take-off means for translating said rotatable movements into a unidirectional drive; internal combustion units arranged in squirrel-cage fashion within said annular blade structures and connected to rotate with one of the structures; and means for directing combustion gases from said units successively against the rows of blades of the said structures.

18. A combined internal combustion and turbine engine comprising a two-part rotary casing divided transversely intermediate its ends; internal combustion units carried by one of the casing parts; a plurality of concentric annular turbine elements extending around the casing, said elements comprising two assemblies rotatable in opposite directions and respectively connected with the casing parts for driving the said parts; means for directing exhaust gases from the combustion units against the said blade assemblies to drive the latter, said internal combustion units having reciprocable pistons; and means powered by the pistons for causing rotation of the casing part having the internal combustion units.

19. A combined internal combustion and turbine engine comprising a two-part rotary casing divided transversely intermediate its ends; internal combustion units carried by one of the casing parts; a plurality of concentric annular turbine elements extending around the casing at the line of division thereof, said elements comprising two nested assemblies respectively connected to the parts adjacent the line of division and operable for driving said parts in opposite directions; and means for directing exhaust gases from the combustion units against the said blade assemblies to drive the latter.

JOSEPH YOUHOUSE.

REFERENCES CITED

The following references are of record in the file of this patent:

UNITED STATES PATENTS

| Number | Name | Date |
|---|---|---|
| 511,044 | Cooper | Dec. 19, 1893 |
| 812,636 | Callan | Feb. 13, 1906 |
| 848,836 | Liebentritt | Apr. 2, 1907 |
| 953,868 | Tcherepanoff | Apr. 5, 1910 |
| 1,147,280 | Thomas | July 20, 1915 |
| 1,323,801 | Werner | Dec. 2, 1919 |
| 1,389,873 | Hult | Sept. 6, 1921 |
| 1,394,811 | Daloz | Oct. 25, 1921 |
| 1,808,664 | Koschka | June 2, 1931 |
| 1,819,715 | Le Bret | Aug. 18, 1931 |
| 1,875,444 | Hall | Sept. 6, 1932 |
| 1,886,492 | Mattson | Nov. 8, 1932 |
| 1,919,755 | Sherman | July 25, 1933 |
| 1,937,077 | West | Nov. 28, 1933 |
| 1,955,799 | Fielden | Apr. 24, 1934 |
| 1,987,699 | Moore | Jan. 15, 1935 |
| 2,182,213 | Redrup | Dec. 5, 1939 |
| 2,263,561 | Biermann | Nov. 25, 1941 |
| 2,326,912 | Allison | Aug. 17, 1943 |
| 2,354,620 | Smith | July 25, 1944 |

FOREIGN PATENTS

| Number | Country | Date |
|---|---|---|
| 2,956 | Great Britain | Nov. 24, 1863 |
| 121,656 | Great Britain | Jan. 2, 1919 |
| 135,897 | Great Britain | Dec. 8, 1919 |
| 271,268 | Great Britain | May 26, 1927 |
| 425,961 | France | Apr. 20, 1911 |
| 429,517 | France | July 20, 1911 |
| 16,032 | France | Aug. 26, 1912 |
| 21,829 | Norway | Oct. 30, 1911 |